United States Patent [19]

Tanaka

[11] Patent Number: 4,718,382
[45] Date of Patent: Jan. 12, 1988

[54] DEVICE FOR CONTROLLING IGNITION TIMING IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 7,220

[22] Filed: Jan. 27, 1987

[30] Foreign Application Priority Data

Feb. 19, 1986 [JP] Japan .................................. 61-34329
Feb. 19, 1986 [JP] Japan .................................. 61-34333

[51] Int. Cl.$^4$ ............................................. F02P 5/14
[52] U.S. Cl. ..................................... 123/425; 123/435
[58] Field of Search .............................. 123/425, 435; 364/431.08

[56] References Cited

U.S. PATENT DOCUMENTS

| | | | |
|---|---|---|---|
| 4,356,551 | 10/1982 | Iwase et al. | 123/425 X |
| 4,481,925 | 11/1984 | Karau et al. | 123/425 |
| 4,549,513 | 10/1985 | Douaud et al. | 123/425 |
| 4,556,030 | 12/1985 | Aono | 123/425 |
| 4,617,895 | 10/1986 | Sakakibara et al. | 123/425 |
| 4,660,535 | 4/1987 | Asano | 123/425 |

*Primary Examiner*—Willis R. Wolfe
*Attorney, Agent, or Firm*—Armstrong, Nikaido, Marmelstein & Kubovcik

[57] ABSTRACT

A device for controlling ignition timing in an internal combustion engine comprises a compression sensor disposed in the vicinity of the combustion chamber of each cylinder. Acceleration and other transient conditions of the engine driving conditions are detected on the basis of the output of the pressure sensor. When a transient condition is detected, the target maximum combustion angle is altered by a prescribed amount in the direction of retarding the ignition timing and the ignition timing of the next cylinder to fire is compensated by an amount which is less than the prescribed amount. As the transient conditions are directly detected from the state of combustion, the transient response is improved, and as the compensation is carried out stepwise, the drivability is improved.

8 Claims, 14 Drawing Figures

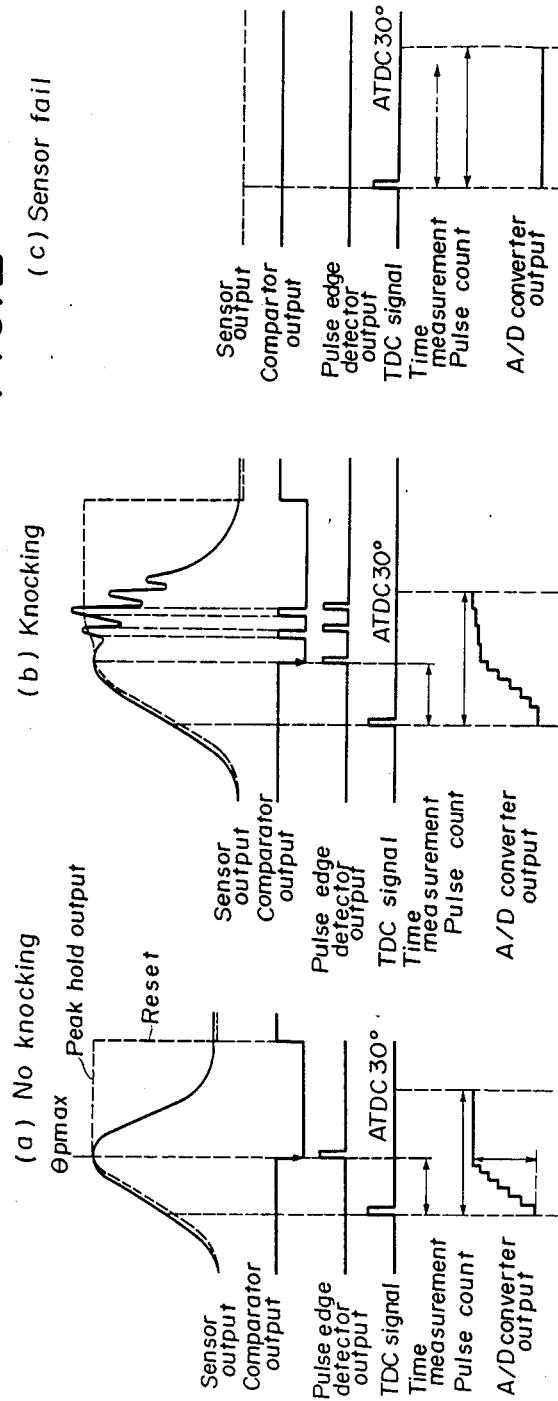
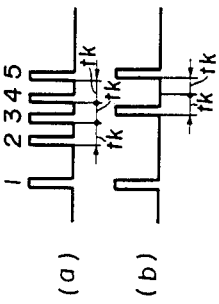

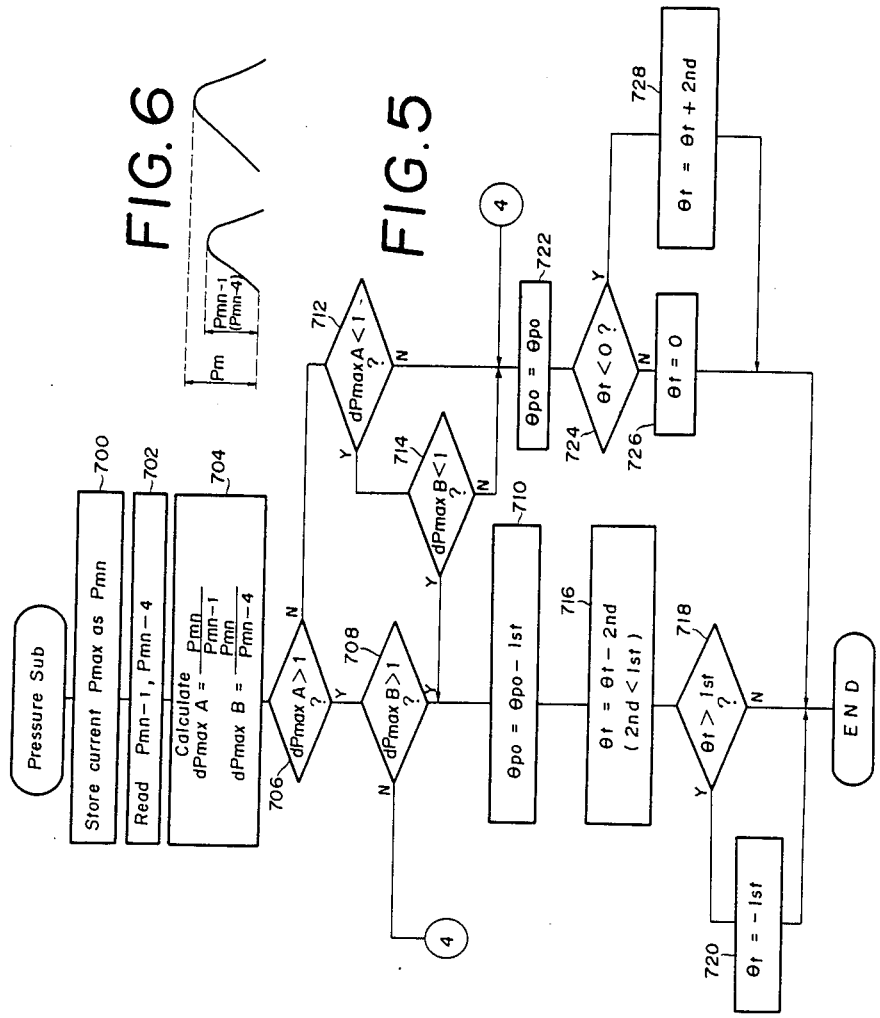

DEVICE FOR CONTROLLING IGNITION TIMING IN INTERNAL COMBUSTION ENGINE

BACKGROUND OF THE INVENTION

1. Field of the Invention

This invention relates to a device for controlling ignition timing in an internal combustion engine, more specifically to a device for controlling ignition timing in an internal combustion engine which improves the transient response of the internal combustion engine by detecting acceleration and other such transient conditions of engine driving operation on the basis of the cylinder pressure of the engine and regulating the ignition timing accordingly.

2. Description of the Prior Art

Conventional devices for controlling ignition timing in internal combustion engines have been arranged to determine a primary ignition timing control value with reference to the engine rpm and load state and then to compensate the primary ignition timing control value on the basis of transient conditions of the engine driving operation detected from the degree of throttle valve opening and the like. One example of such a device is disclosed in Japanese Patent Publication No. 58(1983)-40027. There have also recently been proposed devices which carry out ignition timing on the basis of detected cylinder pressure while detecting the transient conditions on the basis of the throttle valve opening in the same conventional manner. As one example of such a device there can be mentioned that disclosed in Japanese Patent Publication No. 56(1981)-21913.

The first mentioned device has a number of important drawbacks. First, it requires a particular detection means for detecting the transient conditions as well as complex circuitry for processing the outputs of the detection means. As a result the device is inconveniently complex in structure. Further, as feedback control is not carried out, little can be expected in terms of compensation effect. With this type of device, therefore, there has been no choice but to set the primary control value with high accuracy and relegate the compensatory function to a minor, secondary role. Because of this, the volume of mapped control values tends to grow very large so that the device is also disadvantageous in that it has to be provided with a large capacity memory.

The second type of device referred to above is similarly disadvantageous in the point of requiring a similar detection means for detecting the transient conditions and a similar complex circuitry for processing the outputs of the detection means. While the device does employ a feedback control system in which the state of combustion of the engine is directly detected, the deviation of the actual maximum cylinder pressure angle from a target maximum-pressure angle, i.e. ATDC 10°–15°, is determined and the control value is set so as to reduce and eliminate the deviation, it teaches nothing whatsoever about how the deviation, particularly the deviation at the time the engine is in a transient state, can be eliminated without impairing drivability. The device further provides no countermeasure with respect to knocking, the phenomenon that is highly likely to occur when the engine is in the transient state.

SUMMARY OF THE INVENTION

In consideration of the aforesaid shortcomings of the prior art, it is an object of the invention to provide a device for controlling the ignition timing in an internal combustion engine which directly ascertains the state of combustion of the engine on the basis of detected cylinder pressure and then conducts feedback control of the state of combustion, which measures cylinder pressure fluctuations and from the measured pressure fluctuations ascertains transient conditions of the engine, which as a result can be constituted with a smaller number of detection means and processing circuit components, which by ascertaining the transient conditions on the basis of the state of combustion is able to ascertain such conditions with higher accuracy, and which therefore provides improved transient response and drivability.

Another object of the invention is to provide a device for controlling ignition timing in an internal combustion engine which, being provided with means for direct detection of the state of combustion, enables improvement of engine output by converging the maximum cylinder pressure angle $\theta$pmax on a target maximum-pressure angle thereby enabling the ignition to more closely approximate MTB (minimum advance for best torque), and which is able to accurately detect and carry out control to eliminate the knocking which tends to occur particularly often during a transient state and in the vicinity of the MTB point.

In order to achieve the objects, the present invention provides a device for controlling ignition timing in an internal combustion engine comprising combustion state detection means disposed in the vicinity of the combustion chamber of each cylinder of an internal combustion engine for detecting the state of combustion in the combustion chamber, crankshaft angle detection means disposed in the vicinity of a rotating member of the internal combustion engine for detecting the angular position of a crankshaft of the internal combustion engine, maximum cylinder pressure angle calculation means which receives the outputs of the combustion state detection means and the crankshaft angle detection means and calculates the maximum cylinder pressure angle, cylinder pressure calculation means which receives the output of the combustion state detection means and calculates the cylinder pressure, ignition timing calculation means which receives the outputs of the crankshaft angle detection means, the maximum cylinder pressure angle calculation means and the cylinder pressure calculation means and calculates the ignition timing such that the maximum cylinder pressure angle converges on a target angle, and ignition means which receives the output of the ignition timing calculation means and ignites a fuel and air mixture in the combustion chamber, said ignition timing calculation means detecting transient conditions in the engine operation on the basis of the output of the cylinder pressure calculation means, altering the target angle by a prescribed amount, and compensating the ignition timing of the next cylinder to fire by an amount smaller than the prescribed amount.

The above and other features of the present invention will become apparent from the following description made with reference to the drawings.

BRIEF DESCRIPTION OF THE DRAWINGS

FIGS. 2(a)(b) and (c) show waveform diagrams of the output of the maximum cylinder pressure angle signal/knocking signal generation circuit of the device shown in FIG. 1;

FIGS. 4(a) and (b) are waveform diagrams for explaining the method of knocking detection in the flowchart of FIG. 3;

FIG. 5 is a flowchart showing a subroutine of the flowchart of FIG. 3 for calculation of pressure fluctuation rate;

FIG. 6 is a diagram for explaining the calculation method of the flowchart of FIG. 5;

DESCRIPTION OF THE PREFERRED EMBODIMENTS

Figure 1:
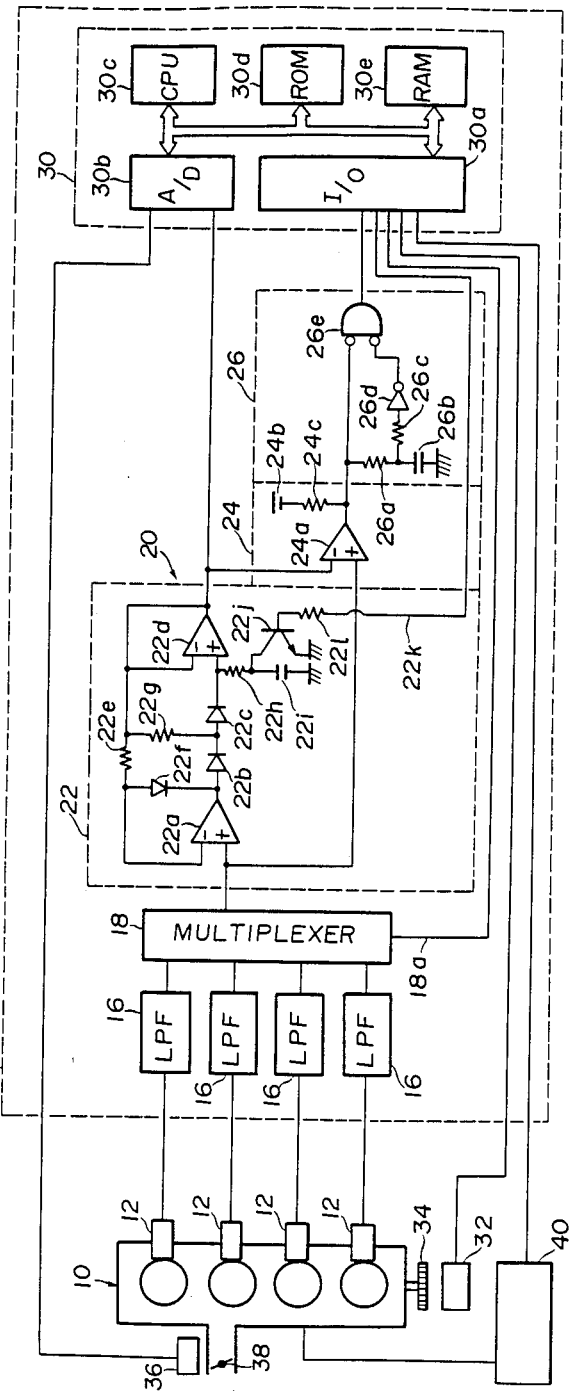
FIG. 1 is a block diagram of a device for controlling ignition timing in an internal combustion engine in accordance with the present invention.

In FIG. 1, the reference numeral 10 denotes a four-cylinder internal combustion engine. Piezoelectric pressure sensors 12 serving as means for detecting the state of combustion are disposed one for each cylinder so as to face into the combustion chamber of the cylinder. The outputs of the pressure sensors are passed through charge-voltage converters or high impedance circuits (neither shown) and then forwarded to a control unit 14 in which they are applied to low pass filters 16. The cut-off frequency of the low pass filters 16 is set higher than knocking frequency so that they will pass the high frequency components caused by any knocking which occurs. The stage following the low pass filters 16 is a multiplexer 18 which is controlled by the CPU of a computer to be described later so as to forward the outputs from the filters 16 to the succeeding stage in the firing order of the cylinders.

The next stage of the control unit 14 following the multiplexer 18 is a maximum cylinder pressure signal/knocking signal generator circuit 20 which is constituted of a peak hold circuit 22, a comparator 24 and a pulse trailing edge detector 26. The output from the multiplexer 18 is first input to the peak hold circuit 22 which holds the peak output of the multiplexer and produces an output as shown in FIG. 2. The circuit 22 includes a first operational amplifier 22a which receives the output of the multiplexer 18 on its non-inverting input terminal. The output terminal of the first operational amplifier 22a is connected through diodes 22b and 22c to the non-inverting input terminal of a second operational amplifier 22d connected with a voltage follower, and the output of the second operational amplifier 22d is fed back through a resistor 22e to the inverting terminal of the first operational amplifier 22a. The negative feedback circuit between the first and second operational amplifiers includes a diode 22f and a resistor 22g. The connection line between the diode 22c and the second operational amplifier 22d is connected to ground through a resister 22h and a capacitor 22i and also to the collector terminal of a transistor 22j which is operated by a CPU (to be described later) through a reset signal line 22k and a resistor 22l.

The peak hold circuit 22 is followed by the comparator 24 which is constituted of a third operational amplifier 24a having a voltage source 24b connected with its output terminal through a resistor 24c. The inverting terminal of the third operational amplifier 24a receives the output of the peak hold circuit 22 while the non-inverting terminal thereof is directly connected with the output terminal of the multiplexer 18. As a small difference is given for the inputs to the inverting and non-inverting terminals of the third operational amplifier 24a when the cylinder pressure maximizes, the comparator 24 outputs a pulse signal when the cylinder pressure peaks. (See FIG. 2.) As will also be noted from FIG. 2, the maximum cylinder pressure angle signal/knocking signal generator 20 is so arranged that in ordinary circumstances when knocking does not occur it produces a single pulse at the time the maximum pressure value is reached (FIG. 2(a)) and in cases where knocking occurs and a high frequency wave component is superposed on the waveform it produces a signal not only at the said time but also at each time thereafter that the output of the pressure sensor (multiplexer) comes to exceed the peak hold output (FIG. 2(b)). As the knocking frequency is about 10 times higher than the cylinder pressure frequency, the charging constant determined by the resistor 22d and the capacitor 22i is set so as to slow the operating speed to a level below the knocking frequency, as shown in FIG. 2(b).

The stage following the comparator 24 is the pulse trailing edge detector 26. This detector 26 is consituted of a resistor 26a, a capacitor 26b, a resistor 26c, an invertor 26d and a NOR gate 26e, and functions to detect the trailing edge of the comparator output and output a pulse of predetermined width for use in facilitating processing operations to be described later. (See FIG. 2.)

Therefore, by measuring the time lapse between a predetermined time point such as TDC (top dead center) and the time point at which the pulse is produced it is possible to determine the time point Tpmax at which the cylinder pressure peaks. The value Tpmax can then be converted into the maximum cylinder pressure angle $\theta$pmax. Moreover, by counting the number of pulses produced it can be determined whether or not knocking has occurred. Also, as shown in FIG. 2(c), if the pressure sensor 12 should fail to function, this can be detected from the fact that no pulse is produced within the time measurement period.

The stage following the pulse trailing edge detector 26 is a microcomputer 30 having an input/output (I/O) terminal board 30a to which the output from the circuit 26 is applied. The microcomputer 30 serves as a maximum cylinder pressure angle calculating means, a cylinder pressure calculating means and as a means for computing the ignition timing and, in addition to the I/O terminal board 30a, has an A/D converter 30b, a CPU 30c, a ROM (read-only memory) 30d and a RAM (random access memory) 30e. The microcomputer 30 is further equipped with a counter for counting the number of pulses output by the circuit 26, a timer counter for measuring the time lapse between the reference time point and the pulse generation time point, a cycle counter for counting the number of ignition cycles for knocking control, and an angle advance counter for counting the number of ignitions following discontinuance of knocking (none of which are shown). The aforesaid counters can, if desired, be incorporated internally in the CPU 30c.

As shown in FIG. 1, the output terminal of the peak hold circuit 22 is also directly connected to an A/D converter 30b, in parallel with the aforesaid connection with the comparator 24. The A/D converter 30b digitally converts the output from the peak hold circuit 22 once per given time or angle interval. The largest data obtained by this conversation is the maximum cylinder pressure Pmax (See FIG. 2.).

A crankshaft angle sensor 32 is disposed in the vicinity of a crankshaft 34 or other rotating member of the internal combustion engine 10 to serve as a means for detecting the crankshaft angle. The sensor 32 produces a cylinder identification signal once per predetermined angle of rotation of the crankshaft, namely, every 720° rotation of the crankshaft in a four-cylinder engine during which one cycle of power strokes are completed in the order of, for example, the first, third, fourth and second cylinders. It also produces TDC signals once every 180° rotation of the crankshaft at the time the respective pistons reach top dead center, and further at predetermined angle intervals produces prescribed unit angle signals as subdivisions of the TDC angle signal. Therefore, by counting the number of TDC signals following production of the cylinder identification signal, it is possible to discriminate which cylinder is at TDC at the time the TDC signal is produced. Further, the engine rpm can be calculated from the unit angle signals. The output from the sensor 32 is first shaped in a wave-shaping circuit (not shown) and then input to the CPU 30c via the I/O terminal board 30a. As for the aforesaid cylinder identification signal, if desired, this can alternatively be obtained as a signal derived from a predetermined amplitude value obtained from the pressure sensor.

For detecting the load condition of the internal combustion engine 10, the engine can be further equipped with a negative pressure sensor 36 disposed downstream a throttle valve 38. This sensor 36 can be used together with the crankshaft angle sensor 32 to detect the operating condition of the engine, and can be used to backup any of the pressure sensors 12 that should malfunction or fail. Further, when used in the manner that will be explained later, the output of the sensor 36 may be used for computing a basic control value for ignition timing.

The stage following the control unit 14 is an ignition unit 40 consisting of an igniter, a distributor and the like. The output of the ignition unit is applied to ignition plugs (not shown) which ignites the fuel and air mixture in the engine combustion chamber. At an appropriate angle of rotation following the production of an output from the crankshaft angle sensor 32, the CPU issues a command through the reset signal line 22k for resetting the peak hold circuit 22, and also issues a gate switchover command to the multiplexer through a signal line 18a.

Figure 3A:
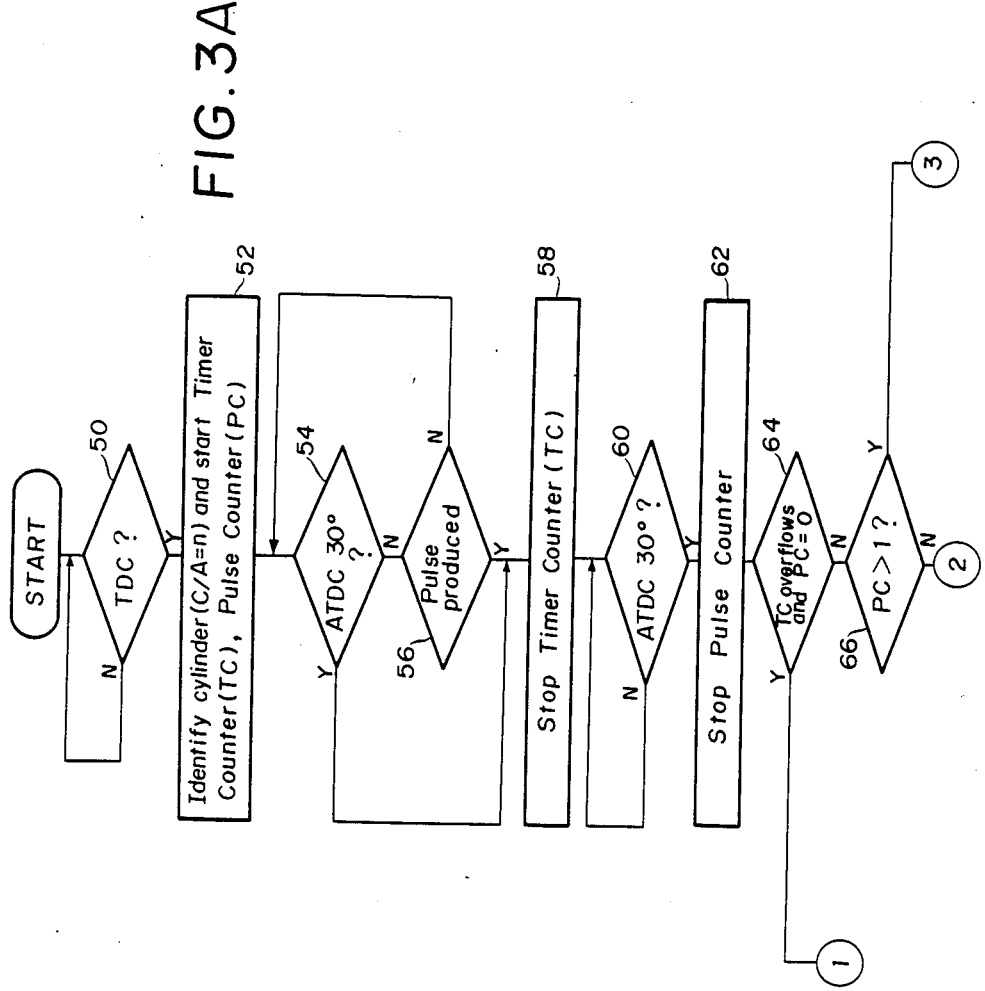
FIGS. 3A and 3B are a flowchart indicating the operation of the device shown in FIG. 1.

The operation of the device according to the invention will now be explained with reference to the flowchart of FIGS. 3A and 3B and the waveform diagrams of FIGS. 2(a)(b) and (c).

To begin with, arrival of the TDC signal is waited for in step 50. On its arrival, the procedure moves to step 52 in which the cylinder is identified and then specified by assigning it the address $C/A=n$ and in which the timer counter (TC) and the pulse counter (PC) are started to initiate the time measurement and pulse count indicated in FIG. 2. The reason for this is that it is a feature of the invention that the ignition control is carried out separately for each cylinder. Here it is assumed that from a prescribed crankshaft angle BTDC (before top dead center) prior to this the output of the pressure sensor for the cylinder concerned was being received through the multiplexer 18.

Next, from steps 54 to 58, if it is determined that even one pulse is produced within a predetermined angle ATDC, for example within 30° ATDC, the timer counter is stopped and then in steps 60 and 62 when arrival at 30° ATDC has been confirmed, the pulse counter is stopped. The pulse counting can be carried out simply by counting the produced pulses one by one or, as shown in FIG. 4(a), by counting them as the pulse level is progressively filtered at a period of tk. FIG. 4(a) and FIG. 4(b) show the cases where a plurality of pulses are produced as the result of knocking (FIG. 4(a)) and noise (FIG. 4(b)), respectively. The counting method using filtering eliminates pulses deriving from noise and for this reason is the more preferable. In view of the knocking frequency and other considerations, the period tk is set at, for example, 125 microsecond.

Next, in step 64 the contents of the timer counter and pulse counter are checked. If, as shown in FIG. 2(c), the number of pulses counted by the pulse counter is still zero in spite of the fact that the timer counter has measured a time lapse extending adequately beyond the point of maximum cylinder pressure, it can be decided that the pressure sensor did not operate normally.

It may be possible to determine after this step as to whether combustion has duly occurred. To be more specific, if the combustion has duly occurred, the maximum cylinder pressure position Tpmax will be within ATDC 10° to 15°. On the other hand, if firing is not done, cylinder pressure will be maximum at the TDC position (mortoring pressure) and will produce a pulse at that position. Therefore, by comparing the measured time of the timer counter with a predetermined value (which may be an appropriate time necessary for arriving at ATDC 10°–15° or so and may be determined taking into consideration of engine rpm) in a step inserted after step 64, it can be found whether the air fuel mixture has been fired. If the measured time is found to be shorter than the predetermined value, it will then be affirmed at a next step whether such no combustion situation will continue for a predetermined ignition cycle or time for leaving an incidental mis-firing out of consideration. If affirmed at the step, fuel supply to a fuel supply device, not shown, will be stopped to save fuel consumption and to protect an exhaust system, not shown, from damage. Warning will be made, if desired.

If this is not the case, it is determined in step 66 whether or not the pulse counter value has exceeded a prescribed value. Although the prescribed value is normally set at 1, if it is considered likely that because of noise a plurality of pulses may be produced even in the case of normal combustion, this value can be set at 2 or larger. When the pulse count value is smaller than the prescribed value, it is decided that knocking did not occur, and the maximum cylinder pressure angle θpmax is obtained in step 68. For determining θpmax it is sufficient to multiply Tpmax, i.e. the time required for the crankshaft to rotate from the reference position to the position at which the cylinder pressure reaches maximum value, by a time-angle conversion factor obtained by the calculation of $((rpm) \times 360°)/60$ sec.

The procedure then moves to step 70 where a subroutine is executed to calculate the cylinder pressure fluctuation. The subroutine is shown by the flowchart of FIG. 5, which will now be explained with reference also to FIG. 6. First in step 700 the maximum cylinder pressure Pmax in the current cycle is stored in the RAM 30e as Pmn. Here it may also be possible, if desired, to compare the detected maximum cylinder pressure with a reference value set in the vicinity of the motoring cylinder pressure to determine whether or not misfiring, mentioned-before, has occurred, and to send a command to the fuel supply device to cause it to cut off the fuel supply so as to protect the exhaust system. Next in step 702, the maximum cylinder pressure Pmn−1 of the preceding cylinder to fire (cylinder address $C/A = n−1$) (FIG. 6) and the maximum cylinder pressure Pmn−4 of the current cylinder (address $C/A = n−4 = n$) four firings earlier (one cycle earlier) are read from the RAM 30e. In the first cycle of operation, these values are set at appropriate initial levels.

Then in step 704, the value Pmn for the current cylinder is divided by the earlier values Pmn−1 and Pmn−4 to obtain the fluctuation rates d Pmax A and d Pmax B, whereafter in step 706 it is first determined whether or not the fluctuation rate d Pmax A is greater than 1. Here the value "1" is defined to include a prescribed dead band, that is, to equal "1 + a prescribed dead band." The dead band is set at, for example, 0.1.

When d Pmax A exceeds 1, that is when the current pressure is higher by more than the prescribed value, it is then determined in step 708 whether the fluctuation d Pmax B exceeds 1 (1 + a prescribed dead band) and if it does, since this means that the fluctuation is relatively large, it is judged that the engine operaiton is in a transient state. In this case the procedure moves to step 710 where the target maximum-pressure angle $\theta$po is altered by a first prescribed angle. More specifically, the target maximum-pressure angle $\theta$po is altered in the retarding direction so as to prevent knocking and avoid deterioration of the exhaust gas composition. The first prescribed angle is therefore set to be one of adequate magnitude to assure that knocking will not be allowed to occur.

On the other hand, if the decision is No in step 706, the procedure shifts to step 712 where it is determined whether the fluctuation rate d Pmax A is less than 1 (1 = a prescribed dead band) and if it is, the procedure moves to step 714 where it is decided whether d Pmax B is less than 1 (1 − a prescribed dead band). If it is, this is decided to indicate a transient state and retarding compensation is carried out in step 710. From the foregoing it will be understood that in accomplishing this invention the inventor focused on the relationship between engine operation and fluctuation in cylinder pressure. In determining whether or not the engine is in a transient state, the possibility of error is reduced to the absolute minimum by carrying out two comparisons, namely by comparing the cylinder pressure of the current cylinder both with that of the cylinder firing immediately before itself and with its own cylinder pressure one cycle earlier, thereby ensuring that no judgement error will arise owing to fluctuations between different cylinders.

After the target maximum-pressure angle $\theta$po has been changed, the procedure moves to step 716 where a transient compensation amount $\theta$t (initially set at zero) for the next cylinder to fire $(C/A = n + 1)$ is set as a second prescribed angle in the direction of retardation. (Subtraction results in retarding the ignition timing.) The second prescribed angle is set to be smaller than the first prescribed angle. In the succeeding step 718, the transient compensation amount $\theta$t is compared with the first prescribed angle and if it is large, the value of $\theta$t is fixed as the first prescribed angle in step 720.

This significance of these procedures will now be more fully clarified. While, as will be explained in more detail later, the control is in principle carried out separately for each cylinder, the transient compensation amount $\theta$t to be applied with respect to the next cylinder to fire (cylinder address $C/A = n + 1$) is set at a value that is less than the target amount of alteration so that the angle is not retarded at one time but is retarded gradually cylinder by cylinder, whereby the desired value is substantially reached by the time the same cylinder fires four firings later. The reasoning is that if a transient condition arises in the current cylinder there is a high possibility of the same condition arising in the succeeding cylinder. Therefore, if identical compensation angles of appropriate magnitude are applied beginning with the next cylinder to fire, it will be possible to substantially achieve the target angle four firings later when the current cylinder will fire the next time. The second prescribed angle is therefore set such that the accrued amount of compensation over four firings will approximately equally the first prescribed angle. As a result, it is possible to avoid degradation of drivability owing to abrupt changes in the ignition timing.

In the case where the decision in any of step 708, 712 and 714 is No, since this means that the cylinder pressure fluctuation rate is within the prescribed range, it is decided that no transient state has occurred and the target maximum-pressure angle $\theta$po is not changed. Instead, if and only if some amount of retarding compensation value $\theta$t remains, the value $\theta$t is gradually returned in the direction of advance by the amount of the second prescribed angle for each firing, so that again no degradation of drivability is caused by abrupt changes in ignition timing (steps 722, 724, 726 and 728). As the cylinder pressure with which the comparison is made it is of course alternatively possible to use that of the cylinder two firings earlier or that of the same (current) cylinder two or more cycles earlier.

Returning to FIG. 3B, after execution of the pressure fluctuation calculation subroutine of step 70, the operation shifts to step 72 where the target maximum-pressure angle $\theta$po and the actual maximum pressure angle $\theta$pmax are compared to obtain the deviation d$\theta$. If the target maximum-pressure angel $\theta$po has been altered in the subroutine of step 70, the compensated value is used in this comparison.

Then in step 74, it is determined whether or not the knocking compensation amount KNR (initially set at zero) is zero, which is done by checking the remaining amount stored in the RAM 30e. If the remaining amount is zero, the procedure moves to step 76 where it is determined whether the deviation d$\theta$ is ahead or behind with respect to the target maximum-pressure angle $\theta$po. If it is "behind," the ignition timing angle is advanced by an addition of an amount equal to the sum of a deviation compensation amount $\theta$pc (initially set at zero) and an appropriately set third prescribed angle (step 78) and if it is "ahead," the ignition timing is retarded by subtraction of the third prescribed angle (step 80). Where it is neither "behind" nor "ahead," the compensation amount $\theta$pc is left unchanged (step 82). If the third prescribed angle is also set at a relatively small value, the deviation will be eliminated gradually in steps, again resulting in improved drivability. As was mentioned earlier, subtraction results in retarding compensation, while addition results in advancing compensation.

When knocking is detected in step 66, the procedure moves to step 84 where a fourth prescribed angle of appropriate magnitude is immediately subtracted from the knocking compensation amount KNR (initially set at zero), whereafter, in steps 86 and 88, retarding of the ignition timing angle is continued until the amount of retarding compensation reaches a fifth prescribed angle (set to be larger than the fourth prescribed angle) and the deviation compensation amount $\theta$pc is used for compensation of the current ignition timing (step 90). In step 74, if the remaining compensation amount KNR is not zero, it is first determined when a prescribed period has lapsed or a prescribed number of firings have occurred following the end of knocking and the ignition timing is then progressively returned in the direction of advance in increments of the fourth prescribed angle (steps 92 and 94). When the deviation $d\theta$ is "ahead" with respect to the target maximum-pressure angle $\theta$po, as there is no need to return the ignition timing in the advance direction, the amount $\theta$pc is retarded by the amount of the third prescribed angle (steps 96 and 80). When it is "behind," the compensation amount $\theta$pc is left unchanged (step 90). Measurement of the time (number of firings) following the end of knocking is carried out using the cycle counter and the advance angle counter in the computer 30.

Next, in step 98, the value obtained by adding the compensation amount $\theta$pc and the knocking compensation amount KNR is defined as feedback compensation amount $\theta$f. When sensor failure is determined in step 64, an appropriately set sixth prescribed angle for retarding the ignition timing is set as the feedback compensation amount (step 100).

Next in step 102, so as to be able to use the so-obtained feedback compensation amount $\theta$f as the compensation value in the succeeding cycle of the same cylinder (cylinder address $C/A=n$), the amount $\theta$f is once stored in the RAM 30e (or used to replace any amount already stored in the RAM 30e). Therefore, since all of the compensation amounts obtained by the aforesaid procedures, except for the transient compensation amount $\theta$t, will be reflected only in the control of the cylinder concerned, it becomes possible to carry out control separately for each cylinder in accordance with the particular state of combustion thereof.

Next in step 104, the compensation amount $\theta$f for the next cylinder to fire (cylinder address $C/A=n+1$) that was stored in the RAM 30e during the preceding cycle of this cylinder (or is at the initial setting of zero if there was no preceding cycle) is read and an ignition command is issued for this cylinder (step 106). The command at this time specifies the ignition timing $\theta$ig as the basic ignition timing $\theta$b+ the fed-back compensation amount $\theta$f+ the transient compensation amount $\theta$t. As $\theta$t and KNR are themselves negative amounts, their "addition" substantially results in a substraction, that is to say in retardation of the ignition timing angle. The amount $\theta$f is the fed-back compensation amount for the cylinder concerned read out in the preceding step and the amount $\theta$t is the compensation for retardation during transient condition calculated for the preceding cylinder $(C/A=n)$ in the subroutine of FIG. 5.

As a result, while the compensation by the compensation amount $\theta$t (and only this compensation) is carried out on the engine level (i.e. not on the individual cylinder level), by in this way applying to the succeeding cylinder the compensation amount $\theta$t that is smaller than the target alteration amount, the retarding of the ignition timing is also carried out gradually at the time the engine is in a state of transition, resulting in improved drivability. Even though the retarding of the ignition timing is carried out stepwise in this way, no problem whatsoever arises regarding the control response since the arrangement is such that the detection of transient state is realized by directly monitoring the combustion condition on the basis of detected cylinder pressure, whereby the detection can be carried out quickly. Moreover, as knocking control capability has also been provided, it is possible to cope adequately with knocking, which is highly likely to occur when the engine is in a transient condition.

As for the basic ignition timing $\theta$b mentioned in connection with step 106, this is set solely with reference to the cylinder pressure, in which case it is set relative to the target maximum-pressure angle $\theta$po. Alternatively, the basic value $\theta$b may be retrieved from mapped values in accordance with the engine rpm and load condition as determined from the outputs of the crankshaft angle sensor 32 and load sensor 36. In the latter case although the basic ignition timing is set based on the engine rpm and load and is stored as mapped values in the ROM 30d, this can be advantageously realized since the arrangement is such that following ignition the deviation of the actual maximum cylinder pressure angle from the target maximum-pressure angle is detected and then used for compensating the mapped value in preparation for the succeeding ignition. As the target angle is approached by repeating this feedback control process in successive cycles, only a small number of values need be mapped in the ROM 30d, meaning that the capacity of this memory need not be large.

Figure 3B:
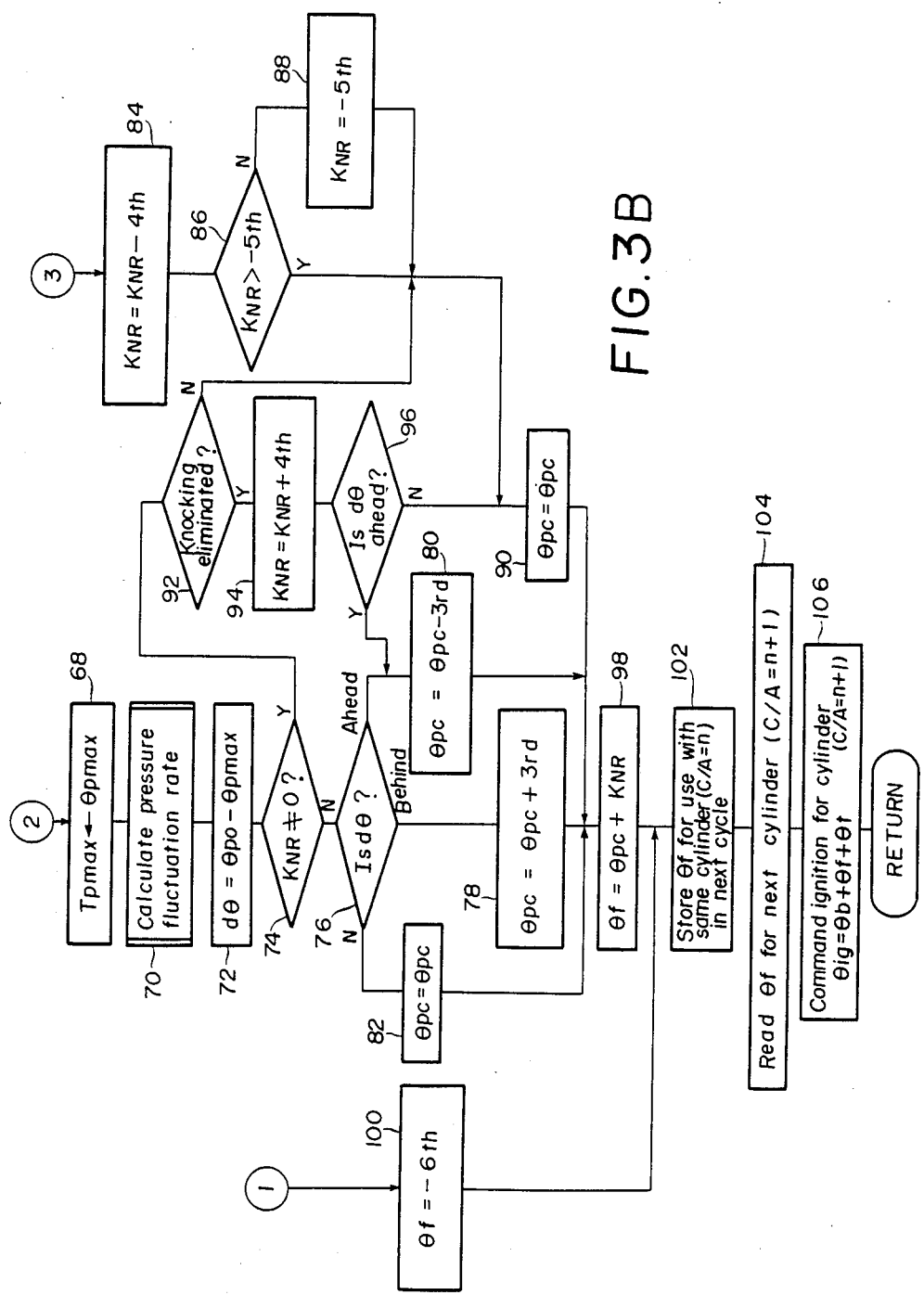
Figures 7, 8:
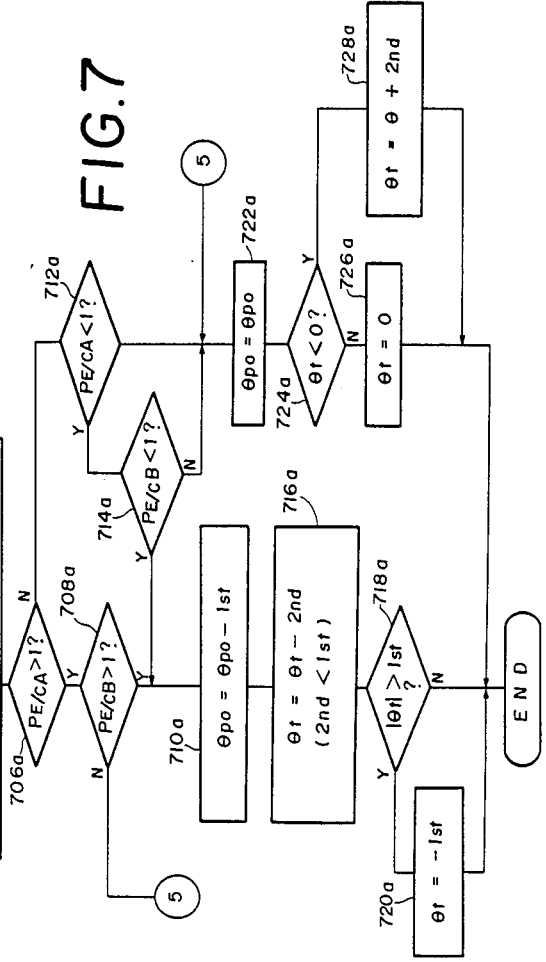
FIG. 7 is a flowchart showing another subroutine for calculation of pressure fluctuation.
FIG. 8 is a diagram for explaining the calculation method of the flowchart of FIG. 7.

FIG. 7 is a flowchart showing another subroutine for calculation of pressure fluctuation rate of the flowchart shown in FIG. 3B. FIG. 8 is a diagram that will be used in connection with the explanation of this flowchart, which will be made primarily with reference to the point in which it differs from the flowchart of FIG. 6.

As shown in FIG. 8, the cylinder pressures p1 and p2 at two arbitrarily selected points located before ignition and separated by a small angular interval $\theta$1, and the pressures p3 and p4 at two arbitrarily selected points located after ignition and separated by a small angular interval $\theta$2 are measured ($\theta$1=$\theta$2<$\theta$po), whereafter the respective pressure increase rates are found and the ratio between them is calculated. This calculation is conducted by the CPU 30c of the microcomputer 30 on the basis of digital values sampled from the A/D converter 30b at prescribed angular positions. Following this, the same ratio is calculated for another (or the same) cylinder executing the power stroke, and the rate of fluctuation between the two ratios is calculated. When the rate of fluctuation is out of "1± a prescribed dead band," it is judged that the engine is in a state of transition and ignition angle retarding compensation is carried out. More specifically, in step 700a the cylinder pressure values p1–p4 are read and the following calculations are made to determine the state before combustion, namely the compression pressure fluctuation rate d PCOMP representing the state of compression, the state following combustion, namely the compression pressure fluctuation rate d PEXP representing the pressure increase rate during combustion, and the ratio between these two values PEXP/COMP.

$$d\,PCOMP = \frac{d(p2 - p1)}{d\theta 1}$$

$$d\,PEXP = \frac{d(p4 - p3)}{d\theta 2}$$

$$P\,EXP/COMP = \frac{d\,PEXP}{d\,PCOMP}$$

The points before ignition mentioned above may be selected anywhere after the intake valve has closed and the piston begins to rise during the compression stroke. Although the points after ignition can be selected anywhere between TDC and the maximum pressure angle $\theta$pmax, it is convenient to select the two mentioned points since these points are obtained from the sensor 34 and the circuit 20. As this method is also carried out separately for each cylinder, the calculated value is designated as PEXP/COMPn and stored in the RAM 30e.

Then in step 702a, the stored values are read out from the RAM 30e for the cylinder one firing earlier $(C/A=n-1)$ and that four firings earlier $(C/A=n-4)$.

The procedure then moves to step 704a where the rates of fluctuation are obtained comparing the value for the current cylinder $(C/A=n)$ with the values read out in the last step. In this case, the rate of fluctuation with respect to the ratio for the cylinder that fired immediately before the current cylinder is designated as PEXP/COMP A, while the rate of fluctuation with respect to the ratio for the same cylinder four firings earlier is designated as PEXP/COMP B.

Namely, $$PEXP/COMP\,A = \frac{PEXP/COMPn}{PEXP/COMPn - 1}$$

$$PEXP/COMP\,B = \frac{PEXP/COMPn}{PEXP/COMPn - 4}$$

Next it is determined in step 706a whether the rate of fluctuation PEXP/COMP A is greater than 1 (1+ a prescribed dead band) and in the case that it is, it is further similarly determined in step 708a whether the other rate of fluctuation PEXP/COMP B is also greater than the same value. If it is, this means that the engine is in a state of transition and further procedures are executed to determine the compensation value. As these stops are the same as those of the flowchart of FIG. 5, they will not be explained again here. The advantage of using this subroutine is that in addition to the advantages explained in connection with the flowchart of FIG. 5 it also provides the advantage that sudden changes in engine rpm will not result in misjudgements since the rates of cylinder pressure fluctuation both before and after ignition are taken into consideration.

Figure 9:
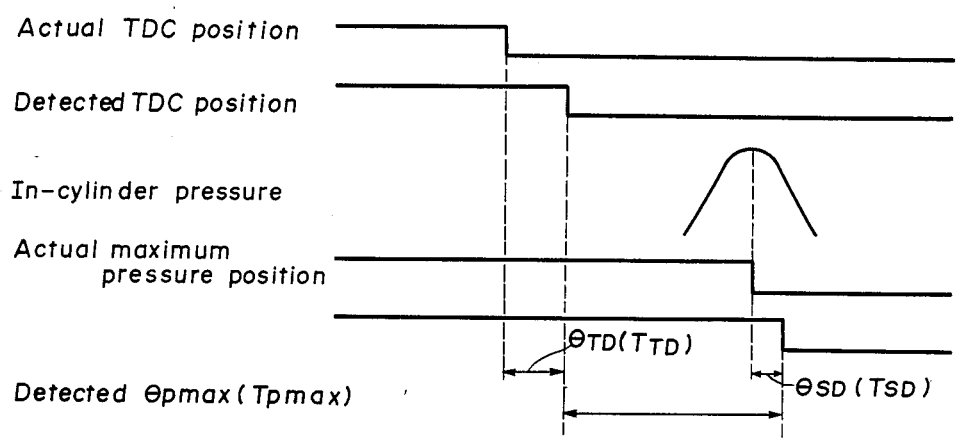
FIG. 9 is a waveform diagram showing the detection delay of a pressure sensor.

Apart from the above, as shown in the diagram in FIG. 9, the detection by the pressure sensors is actually somewhat delayed. As illustrated, in the detection of TDC there arises a time or angular delay ($\theta$TD or TTD), while in the detection of the maximum pressure position there arises a time or angular delay ($\theta$SD or TSD). Therefore, the actual maximum pressure angle $\theta$pmaxACT has to be derived by the calculation: $\theta pmaxACT = QTD + (\theta pmax - \theta SD)$.

Figure 10:
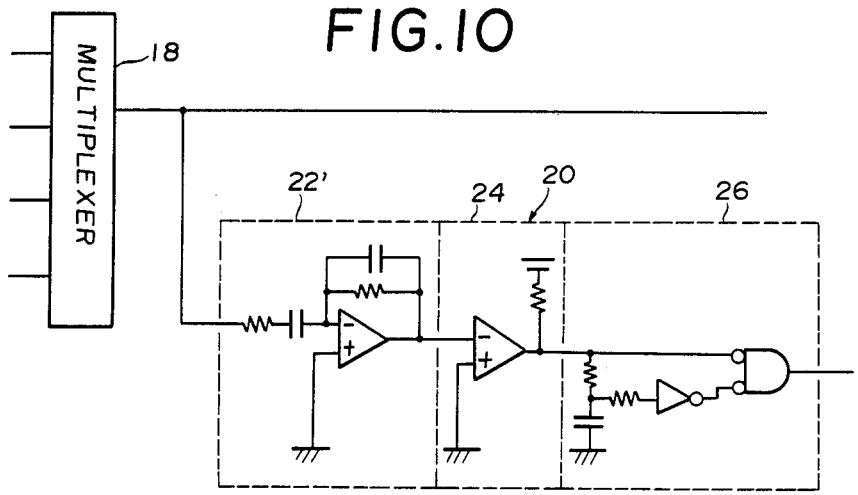
FIG. 10 is a block diagram of one section of a second embodiment of the device according to this invention.

FIG. 10 is a partial view of another embodiment of the device according to this invention, the remaining portions of which are identical with those of FIG. 1. In this embodiment, the peak hold circuit 22 of the maximum cylinder pressure angle signal/knocking signal generator 20 in FIG. 1 is replaced with a differentiation circuit 22'. When the output of the multiplexer 18 is input to the differentiation circuit 22', the output thereof crosses zero at the time the waveform from the multiplexer reaches the position of maximum cylinder pressure and at the portion thereof superposed with the knocking frequency. Otherwise the device according to this embodiment is the same as that illustrated in FIG. 1.

While the above description discloses preferred embodiments of the invention, it is to be understood that numerous modifications or alterations may be made without departing from the scope of the invention as set forth in the following claims.

What is claimed is:

1. A device for controlling ignition timing in an internal combustion engine, comprising:
  a. combustion state detection means disposed in the vicinity of the combustion chamber of each cylinder of an internal combustion engine for detecting the state of combustion in the combustion chamber,
  b. crankshaft angle detection means disposed in the vicinity of the rotating member of the internal combustion engine for detecting the angular position of a crankshaft of the internal combustion engine,
  c. maximum cylinder pressure angle calculation means which receives the outputs of the combustion state detection means and the crankshaft angle detection means and calculates the maximum cylinder pressure angle,
  d. cylinder pressure calculation means which receives the output of the combustion state detection means and calculates the cylinder pressure,
  e. ignition timing calculation means which receives the outputs of the crankshaft angle detection means, the maximum cylinder pressure angle calculation means and the cylinder pressure calculation means and calculates the ignition timing such that the maximum cylinder pressure angle converges on a target angle, and
  f. ignition means which receives the output of the ignition timing calculation means and ignites a fuel and air mixture in the combustion chamber,
  said ignition timing calculation means detecting transient conditions in the engine operation on the basis of the output of the cylinder pressure calculation means, altering the target angle by a prescribed amount, and compensating the ignition timing of the next cylinder to fire by an amount smaller than the prescribed amount.

2. A device for controlling ignition timing in an internal combustion engine according to claim 1 wherein the detection of transient conditions is carried out by calculating the rate of fluctuation in maximum cylinder pressure among a plurality of cylinders in their power strokes.

3. A device for controlling ignition timing in an internal combustion engine according to claim 2 wherein said plurality of cylinders in their power strokes is constituted of different cylinders in their power strokes in the same or different cycles, or of the same cylinder in its power stroke in successive cycles.

4. A device for controlling ignition timing in an internal combustion engine according to claim 1 wherein the detection of transient conditions is carried out by calculating the pressure increase rates before and after ignition in one and the same cylinder, calculating the ratio of one of said pressure increase rates to the other, calculating the same ratio for a different cylinder or the same cylinder in a different cycle, and calculating the rate of fluctuation between the two ratios.

5. A device for controlling ignition timing in an internal combustion engine according to any of claims 1 to 4 wherein the compensation carried out at the time of detection of a transient condition is compensation for retarding the ignition timing.

6. A device for controlling ignition timing in an internal combustion engine, comprising:
   a. combustion state detection means disposed in the vicinity of the combustion chamber of each cylinder of an internal combustion engine for detecting the state of combustion in the combustion chamber,
   b. crankshaft angle detection means disposed in the vicinity of the rotating member of the internal combustion engine for detecting the angular position of a crankshaft of the internal combustion engine,
   c. maximum cylinder pressure angle calculation means which receives the outputs of the combustion state detection means and the crankshaft angle detection means and calculates the maximum cylinder pressure angle,
   d. cylinder pressure calculation means which receives the output of the combustion state detection means and calculates the cylinder pressure,
   e. ignition timing calculation means which receives the outputs of the crankshaft angle detection means, the maximum cylinder pressure angle calculation means and the cylinder pressure calculation means and calculates the ignition timing such that the maximum cylinder pressure angle converges on a target angle, and
   f. ignition means which receives the output of the ignition timing calculation means and ignites a fuel and air mixture in the combustion chamber,
   whereby said ignition timing calculation means detecting transient conditions in the engine driving operation on the basis of the output of the cylinder pressure calculation means.

7. A device for controlling ignition timing in an internal combustion engine according to claim 6 wherein the detection of transient conditions is carried out by calculating the rate of fluctuation in maximum cylinder pressure among a plurality of cylinders in their power strokes.

8. A device for controlling ignition timing in an internal combustion engine according to claim 6 wherein the detection of transient conditions is carried out by calculating the pressure increase rates before and after ignition in one and the same cylinder, calculating the ratio of one of said pressure increase rates to the other, calculating the same ratio for a different cylinder or the same cylinder in a different cycle, and calculating the rate of fluctuation between the two ratios.

* * * * *